(12) United States Patent
Payne

(10) Patent No.: US 8,968,457 B2
(45) Date of Patent: Mar. 3, 2015

(54) CATIONIC MINIMAL TRACKING ASPHALT EMULSION

(75) Inventor: Barry Payne, Tuscaloosa, AL (US)

(73) Assignee: Hunt Refining Company, Tuscaloosa, AL (US)

( * ) Notice: Subject to any disclaimer, the term of this patent is extended or adjusted under 35 U.S.C. 154(b) by 151 days.

(21) Appl. No.: 13/616,475

(22) Filed: Sep. 14, 2012

(65) Prior Publication Data
US 2014/0076199 A1    Mar. 20, 2014

(51) Int. Cl.
*C08L 95/00* (2006.01)

(52) U.S. Cl.
USPC .......................................... 106/277; 106/278

(58) Field of Classification Search
USPC .................................. 106/277, 278
See application file for complete search history.

(56) References Cited

U.S. PATENT DOCUMENTS

| | | | | |
|---|---|---|---|---|
| 4,579,593 A | * | 4/1986 | Stanley | 106/277 |
| 4,745,155 A | * | 5/1988 | Grossi | 525/54.5 |
| 5,405,439 A | * | 4/1995 | Marchal | 106/277 |
| 5,925,695 A | * | 7/1999 | Ohtsuka et al. | 524/68 |
| 6,384,112 B1 | * | 5/2002 | Boussad | 106/277 |
| 6,840,991 B2 | * | 1/2005 | Honma et al. | 106/277 |
| 7,084,195 B2 | * | 8/2006 | Suzuki | 524/60 |
| 7,503,724 B2 | * | 3/2009 | Blacklidge | 404/82 |
| 7,918,624 B2 | * | 4/2011 | Blacklidge | 404/75 |
| 2005/0098065 A1 | * | 5/2005 | Guerin et al. | 106/277 |
| 2010/0206197 A1 | * | 8/2010 | Uguet Canal et al. | 106/277 |
| 2011/0206455 A1 | * | 8/2011 | Blacklidge | 404/17 |
| 2012/0063843 A1 | * | 3/2012 | Blacklidge | 404/31 |
| 2012/0244278 A1 | * | 9/2012 | Lommerts et al. | 427/138 |
| 2013/0045048 A1 | * | 2/2013 | Campbell | 106/278 |

FOREIGN PATENT DOCUMENTS

GB    2458970 A  * 10/2009

OTHER PUBLICATIONS

Blacklidge Emulsion, Inc.; Storage, Handling and Application Guidelands for Trackless Tack; Printed Sep. 15, 2014; http://www.blacklidgeemulsions.com/products . . . .

* cited by examiner

*Primary Examiner* — Helene Klemanski

(74) *Attorney, Agent, or Firm* — Smith, Gambrell & Russell

(57) ABSTRACT

The cationic asphalt material of the present invention has minimal tracking, fast drying bonding to material and allows for quick turn around in road construction. It has been designed as a joint sealer that can be used successfully as a tack coat or fog seal. The fast drying bonding material allows plant mix asphalt to be put clown in minutes from initial application.

20 Claims, No Drawings

CATIONIC MINIMAL TRACKING ASPHALT EMULSION

BACKGROUND OF THE INVENTION

The present invention relates to the field of asphalt paving and materials used therein.

Plant mix asphalt paving material uses rock and sand used which generally carry a negative charge which gives a stronger bond in between paving layers (i.e. opposite sides of magnets are attracted to one another). In the production of hot mix asphalt (HMA), heat is used to liquefy the asphalt so it will coat the aggregate and remain workable during transport, lay down, and compaction, as the asphalt cools, it hardens and regains the binding properties that make it an effective paving material.

When asphalt is milled into microscopic particles and dispersed in water with a chemical emulsifier, it becomes an asphalt emulsion. The tiny droplets of asphalt remain uniformly suspended until the emulsion is used for its intended purpose. In the emulsion state, the emulsifier molecules orient themselves in and around droplets of asphalt. The chemistry of the emulsifier/asphalt/water systems determines the dispersion and the stability of the suspension. When emulsions are used in the field, the water evaporates into the atmosphere, and the chemical emulsifier is retained with the asphalt. Asphalt emulsions are classified into three categories: anionic, cationic and nonionic. The anionic and cationic classes refer to the electrical charges surrounding the asphalt particles. This identification system stems from a basic law of physics: like charges repel one another and unlike charges attract.

In typical asphalt pavement structure, there are multiple layers. During paving, mechanical limitations prevent covering the entire surface area with a single pass of a paving machine. A typical road needs a minimal of two adjacent passes by the paving machine. The two passes create a joint between the asphalt laid, thus the strips of asphalt need to be bonded together to act as a single road surface. Joint sealant is the liquid material that is used to bond the two together. Tack coat is a very light spray application of asphalt emulsion. It is used to promote a bond between the existing surface and a new superjacent asphalt application. A tack coat is typically recommended for all overlays.

Tracking is defined as residual asphalt that sticks to the surface when a dump truck loaded with plant mix that will be dumped into the spreader backs across the tack coated treated surface and releases as it leaves the surface. Low tracking is very important where rapid adhesion is necessary. Examples include high traffic areas, where there is minimal traffic control, or where there is heavy truck traffic.

SUMMARY OF THE PRESENT INVENTION

It is an object of the present invention to create a stronger electrical bond to typical negative surfaces in an asphalt emulsion.

It is a further object of the invention to provide a cationic asphalt material that has minimal tracking and a fast drying bonding material that allows for quick turn around in road construction.

These and other objects and advantages of the invention will become apparent from the following detailed description of the preferred embodiment of the invention.

DESCRIPTION OF THE PREFERRED EMBODIMENT

The cationic asphalt material of the present invention has minimal tracking, fast drying bonding to material and allows for quick turn around in road construction. It has been designed as a joint sealer that can be used successfully as a tack coat or fog seal. The fast drying bonding material allows plant mix asphalt to be put down in minutes from initial application. This minimal tracking quality also allows for less clean up of roadways and equipment after job completion. It is a cationic emulsion that is compatible with other cationic emulsions along with cutback asphalts and straight paving grade asphalts. With the high elasticity and bonding properties it should provide for longer life on finished roads. The cationic emulsion is a positive charged asphalt emulsion.

This is useful is because frequently road contractors use a single distributor truck for spraying down tack coat and joint seal and this emulsion is compatible with all other cationic emulsions and also straight PG graded asphalts and cutback asphalts. The chemistry of this emulsion retains its tacky properties which promotes adhesiveness with minimal tracking on areas outside of the targeted paving surface.

The emulsion also has an above average elasticity compared to any other available marketed products.

Typical acceptable parameters for bond strength of the material using ALDOT-430 test procedure are 100 psi. This emulsion has a bond strength which is twice the acceptable number.

The preferred embodiment of the invention contemplates an asphalt emulsion comprised of 40 wt % to 70 wt % asphalt composition, 30 wt % to 60 wt % water, 0.1 wt % to 10 wt % polymer, 0.0 wt % to 6 wt % crude oil distillate, sodium chloride 0.05 wt % to 1.0 wt %, a surfactant acting as a cationic emulsifier 0.21 wt %-0.50 wt % and muriatic acid 0.1 wt % to 1.0 wt %. The emulsion is a cationic emulsion that has a rapid curing time similarly to NTSS-1HM but being cationic has a positive charge. The surfactant may be, by way of example, INDULIN AA-89 available from MeadWestvaco. Polymer additive, such as latex, is blended into the asphalt composition through a static mixer. The surfactant can be blended with muriatic acid at 20 Baume strength in a vat of water. The asphalt emulsion tack is designed to have minimal tracking.

| Emulsion Specifications | | |
|---|---|---|
| Property | Standard | value |
| Viscosity@77 F. | AASHTO T59 | 30-400 seconds |
| Residue by Distillation | AASHTO T59 | 50 wt % minimum |
| Particle Charge | AASHTO T59 | Positive |
| Sieve Test | AASHTO T59 TEST ON RESIDUE | 0.1 wt % maximum |
| Penetration 100 g. 5 sec.@77 F. | AASHTO T49 | 45-90 |
| Ductility@77 F. | AASHTO T51 | 60 centimeters minimum |
| Elastic Recovery@50 F. | AASHTO T301 | 50 wt % minimum |

The present invention may also be applied as a light application of asphalt emulsion diluted with water to an existing surface. As such the asphalt emulsion mixed in a ratio of between about 50:50 to about 80:20 emulsion with water forms a fog seal, used to renew old hot mix asphalt pavement surfaces that have become dry and brittle with age, to seal small cracks and surface voids, and to inhibit raveling.

Examples of the use of the various embodiments are set forth hereinafter.

1800 gallons of the composition were heated to 160° F. and dispersed as a tack coat at a rate of 0.05 gallon per square yard.

The ambient temperature was 64° F. and the material was essentially trackless after four minutes of curing.

2000 gallons of composition at 150° F. were mixed with water at 180° F. to 190° F. at a ratio of 80:20 and dispersed at 0.25 gallons per square yard to form a fog seal which provided good coverage in a single pass.

It is to be understood that the form of the invention shown is a preferred embodiment thereof and that various changes and modifications may be made therein without departing from the spirit of the invention or scope as defined in the following claims.

What is claimed is:

1. A composition for use in asphalt paving comprising:
   a tack coat that is fast drying with minimal tracking properties comprising:
   a. from about 40 wt % to about 70 wt % asphalt composition,
   b. from about 30 wt % to about 60 wt % water,
   c. from about 0.1 wt % to about 10 wt % latex polymer,
   d. from about 0.05 wt % to about 1.0 wt % sodium chloride,
   e. from about 0.21 wt % to about 0.5 wt % surfactant, and
   f. from about 0.1 wt % to about 1.0 wt % muriatic acid,
      wherein said composition is a cationic emulsion.

2. A composition as described in claim 1 wherein said polymer comprises 3 wt % to 6 wt %.

3. A composition as described in claim 1 wherein said asphalt composition comprises 50 wt % to 70 wt %.

4. A composition as described in claim 3 having a viscosity at 77 degrees F. according to AASHTO T59 of 30 to 400 seconds.

5. A composition as described in claim 1 wherein said surfactant is blended with muriatic acid at 20 Baume strength in a vat of water.

6. A composition as described in claim 1 having a viscosity at 77 degrees F. according to AASHTO T59 of 30 to 400 seconds.

7. A composition as described in claim 1 having a sieve test according to AASHTO T59 of 0.1 wt %.

8. A composition as described in claim 1 further comprising from about 0.01 wt % to about 6 wt % crude oil distillate.

9. A composition as described in claim 8 having a sieve test according to AASHTO T59 of 0.1 wt %.

10. A composition as described in claim 8 having a viscosity at 77 degrees F. according to AASHTO T59 of 30 to 400 seconds.

11. A composition as described in claim 10 having a sieve test according to AASHTO T59 of 0.1 wt %.

12. A composition as described in claim 8 wherein said surfactant is blended with muriatic acid at 20 Baume strength in a vat of water.

13. A composition as described in claim 8 which breaks and leaves a residue having Penetration 100 g. 5 sec. at 77 degrees F. according to AASHTO T49 of 45-90.

14. A composition as described in claim 8 which breaks and leaves a residue having ductility at 77 degrees F. according to AASHTO T51 of 60 centimeters minimum.

15. A composition as described in claim 8 which breaks and leaves a residue having elastic recovery at 50 degrees F. according to AASHTO 301 of 50 wt % minimum.

16. A composition as described in claim 11 which breaks and leaves a residue having: Penetration 100 g. 5 sec. at 77 degrees F. according to AASHTO T49 of 45-90; ductility at 77 degrees F. according to AASHTO T51 of 60 centimeters minimum; and elastic recovery at 50 degrees F. according to AASHTO 301 of 50 wt % minimum.

17. The composition as described in claim 1 wherein said surfactant is a cationic emulsifier.

18. A method for bonding together two strips of asphalt utilizing a cationic minimal tracking tack coat comprising the steps of:
   a. laying a first strip of asphalt;
   b. applying a fast drying, minimal tracking tack coat to the first strip of asphalt, the tack coat comprising:
      from about 40 wt % to about 70 wt % asphalt composition,
      from about 30 wt % to about 60 wt % water,
      from about 0.1 wt % to about 10 wt % latex polymer,
      from about 0.05 wt % to about 1.0 wt % sodium chloride,
      from about 0.21 wt % to about 0.5 wt % surfactant, and
      from about 0.1 wt % to about 1.0 wt % muriatic acid,
         wherein said composition is a cationic emulsion; and
   c. laying a second strip of asphalt on the tack coat applied to the first strip of asphalt.

19. A composition for utilization in asphalt paving comprising:
   a joint sealant that is fast drying with minimal tracking properties joining two adjacent two strips of asphalt, said joint sealant comprising:
   a. from about 40 wt % to about 70 wt % asphalt composition,
   b. from about 30 wt % to about 60 wt % water,
   c. from about 0.1 wt % to about 10 wt % latex polymer,
   d. from about 0.05 wt % to about 1.0 wt % sodium chloride,
   e. from about 0.21 wt % to about 0.5 wt % surfactant, and
   f. from about 0.1 wt % to about 1.0 wt % muriatic acid,
      wherein said composition is a cationic emulsion.

20. A method for bonding together two strips of asphalt utilizing a cationic minimal tracking joint sealant comprising the steps of:
   a. laying a first pass of asphalt;
   b. laying a second pass of asphalt;
   c. applying a joint sealant between the first pass of asphalt and the second pass of asphalt, the joint sealant comprising:
      from about 40 wt % to about 70 wt % asphalt composition,
      from about 30 wt % to about 60 wt % water,
      from about 0.1 wt % to about 10 wt % latex polymer,
      from about 0.05 wt % to about 1.0 wt % sodium chloride,
      from about 0.21 wt % to about 0.5 wt % surfactant, and
      from about 0.1 wt % to about 1.0 wt % muriatic acid,
         wherein said composition is a cationic emulsion.

* * * * *